US009776677B2

(12) United States Patent
Yakimishyn

(10) Patent No.: US 9,776,677 B2
(45) Date of Patent: Oct. 3, 2017

(54) LIFT AXLE SUSPENSION

(71) Applicant: Kelly W Yakimishyn, Edmonton (CA)

(72) Inventor: Kelly W Yakimishyn, Edmonton (CA)

(*) Notice: Subject to any disclaimer, the term of this patent is extended or adjusted under 35 U.S.C. 154(b) by 0 days.

(21) Appl. No.: 15/040,886

(22) Filed: Feb. 10, 2016

(65) Prior Publication Data

US 2017/0225729 A1    Aug. 10, 2017

(51) Int. Cl.
| | |
|---|---|
| *B62D 61/12* | (2006.01) |
| *B60G 17/052* | (2006.01) |
| *B60G 11/28* | (2006.01) |

(52) U.S. Cl.
CPC ............ *B62D 61/125* (2013.01); *B60G 11/28* (2013.01); *B60G 17/0523* (2013.01); *B62D 61/12* (2013.01); *B60G 2204/4702* (2013.01)

(58) Field of Classification Search
CPC combination set(s) only.
See application file for complete search history.

(56) References Cited

U.S. PATENT DOCUMENTS

| | | | |
|---|---|---|---|
| 3,096,995 A | 7/1963 | Richnow, Jr. | |
| 3,201,141 A | 8/1965 | Bernstein et al. | |
| 3,694,001 A | 9/1972 | McGee | |
| 3,771,617 A | 11/1973 | Hornung | |
| 4,000,913 A | 1/1977 | Gibson | |
| 4,065,143 A | 12/1977 | Iida | |
| 4,141,430 A * | 2/1979 | Eddy, Jr. ............ | B60G 17/0155 180/24.02 |
| 4,171,830 A | 10/1979 | Metz | |
| 4,252,340 A | 2/1981 | Egging | |
| 4,256,326 A | 3/1981 | Cantrell et al. | |
| 4,284,156 A * | 8/1981 | Carstensen .......... | B60G 17/033 180/24.02 |
| 4,293,145 A | 10/1981 | Taylor | |
| 4,353,393 A | 10/1982 | Schniter | |
| 4,783,096 A * | 11/1988 | Ramsey ................ | B62D 61/12 280/124.106 |

(Continued)

FOREIGN PATENT DOCUMENTS

| | | | | |
|---|---|---|---|---|
| CA | 2818422 A1 | | 12/2014 | |
| FR | 2919571 A1 * | | 2/2009 | ............. B60G 9/003 |
| JP | 56063505 A * | | 5/1981 | ............... B60G 5/02 |

OTHER PUBLICATIONS

Neway Anchorok Suspensions, Internet printout, 3 pages, dated Mar. 4, 2005 [To Follow].

(Continued)

*Primary Examiner* — Nicole Verley
(74) *Attorney, Agent, or Firm* — Davis & Bujold PLLC; Michael J. Bujold

(57) ABSTRACT

A lift axle suspension for a tandem trailer has first and second suspension air bags for first and second axles. There is a lift air bag that, when pressurized, applies a lifting force to lift the second axle relative to the first axle. A first pneumatic circuit supplies compressed air to the first suspension air bag and a diverter valve and is controlled by a height selector valve that is opened and closed based on the ride height of the trailer. The diverter valve selectively supplies compressed air to the second suspension air bag and a pressure regulator that limits air pressure to a predetermined pressure. A second pneumatic supplies compressed air to the lift air bag and is controlled by a pilot valve.

4 Claims, 6 Drawing Sheets

(56) References Cited

U.S. PATENT DOCUMENTS

| | | | |
|---|---|---|---|
| 4,832,141 A | 5/1989 | Perini et al. | |
| 4,854,409 A * | 8/1989 | Hillebrand | B62D 61/125 |
| | | | 180/24.02 |
| 4,944,526 A | 7/1990 | Eberling | |
| 5,018,593 A | 5/1991 | Hermann | |
| 5,037,126 A | 8/1991 | Gottschalk et al. | |
| 5,120,041 A | 6/1992 | Schniter | |
| 5,121,808 A | 6/1992 | Visentini et al. | |
| 5,161,579 A | 11/1992 | Anderson, Jr. | |
| 5,230,528 A | 7/1993 | Van Raden et al. | |
| 5,282,644 A | 2/1994 | Larson | |
| 5,299,469 A | 4/1994 | Meyer et al. | |
| 5,403,031 A * | 4/1995 | Gottschalk | B60G 9/02 |
| | | | 280/124.157 |
| 5,447,083 A | 9/1995 | Henderson | |
| 5,489,113 A | 2/1996 | Torborg | |
| 5,549,322 A | 8/1996 | Hauri | |
| 5,601,032 A | 2/1997 | Kosch | |
| 5,655,788 A | 8/1997 | Peaker | |
| 6,003,885 A | 12/1999 | Richardson | |
| 6,158,750 A | 12/2000 | Gideon et al. | |
| 6,225,962 B1 | 5/2001 | Blanchard et al. | |
| 6,273,631 B1 | 8/2001 | Takahashi et al. | |
| 6,283,483 B1 | 9/2001 | Johnson et al. | |
| 6,398,236 B1 | 6/2002 | Richardson | |
| 6,412,790 B2 | 7/2002 | McKenzie et al. | |
| 6,416,069 B1 | 7/2002 | Ramsey | |
| 6,796,566 B2 * | 9/2004 | VanDenberg | B60G 7/02 |
| | | | 280/124.128 |
| 6,997,464 B2 * | 2/2006 | Yakimishyn | B60G 5/00 |
| | | | 280/6.159 |
| 7,303,201 B2 | 12/2007 | Yakimishyn | |
| 7,828,304 B2 * | 11/2010 | Amrine, Jr. | B60G 17/0523 |
| | | | 280/6.157 |
| 9,637,189 B2 * | 5/2017 | Karel | B62D 61/125 |
| 2004/0051261 A1 * | 3/2004 | Yakimishyn | B60G 5/00 |
| | | | 280/5.514 |
| 2005/0087948 A1 * | 4/2005 | Yakimishyn | B60G 5/00 |
| | | | 280/124.128 |
| 2007/0216121 A1 * | 9/2007 | Amrine | B60G 17/0523 |
| | | | 280/86.5 |
| 2011/0266410 A1 * | 11/2011 | Khajepour | B60G 11/27 |
| | | | 248/560 |

OTHER PUBLICATIONS www.NTIS.gov, Evaluation of the Lift Axle Regulation (WAC 468.38.280) in Washington, Washington State Transportation Center, Pullman, Jun. 1994, 152 Pages.

Gregg Distributors Ltd., Product Catalogue—Air Suspension Products, p. 64-65, at least as early as 2002.

* cited by examiner

LIFT AXLE SUSPENSION

TECHNICAL FIELD

This relates to a lift axle suspension.

BACKGROUND

The use of a lift axle suspension enables a driver of a vehicle to lift one or more axles in order to selectively transfer more weight to the tires that remain on the ground. This may be done when the vehicle is unloaded in order to increase traction, provide more controlled braking, to increase fuel mileage, and to save tire wear.

Examples of lift axle suspensions include U.S. Pat. No. 6,997,464 (Yakimishyn) entitled "Lift Axle Suspension" and U.S. Pat. No. 7,303,201 (Yakimishyn) entitled "Air Suspension System for a Vehicle".

SUMMARY

There is provided a lift axle suspension for a tandem trailer. The tandem trailer comprises at least a first axle and a second axle. The lift axle suspension comprises a first suspension air bag mounted to act as suspension for the first axle, a second suspension air bag mounted to act as suspension for the second axle, and a lift air bag that, when pressurized, applies a lifting force to lift the second axle relative to the first axle. A first pneumatic circuit connects the supply of compressed air to each of the first suspension air bag and a diverter valve. The flow of compressed air through the first pneumatic circuit is controlled by a height selector valve that is opened and closed based on the ride height of the trailer. The diverter valve has a first position that supplies compressed air to the second suspension air bag and a second position that supplies compressed air to a pressure regulator that limits air pressure to a predetermined pressure. A second pneumatic circuit connects a supply of compressed air to the lift air bag. The flow of compressed air through the first pneumatic circuit is controlled by a pilot valve that is opened when the diverter valve is in the second position.

According to another aspect, the pilot valve may be pneumatically actuated, and the pilot valve may be opened when air pressure is applied to the regulator.

According to another aspect, the supply of compressed air may comprise a pneumatic air cylinder connected to the first and second pneumatic cylinders.

According to another aspect, the second pneumatic circuit comprises an override switch that closes the second pneumatic circuit.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
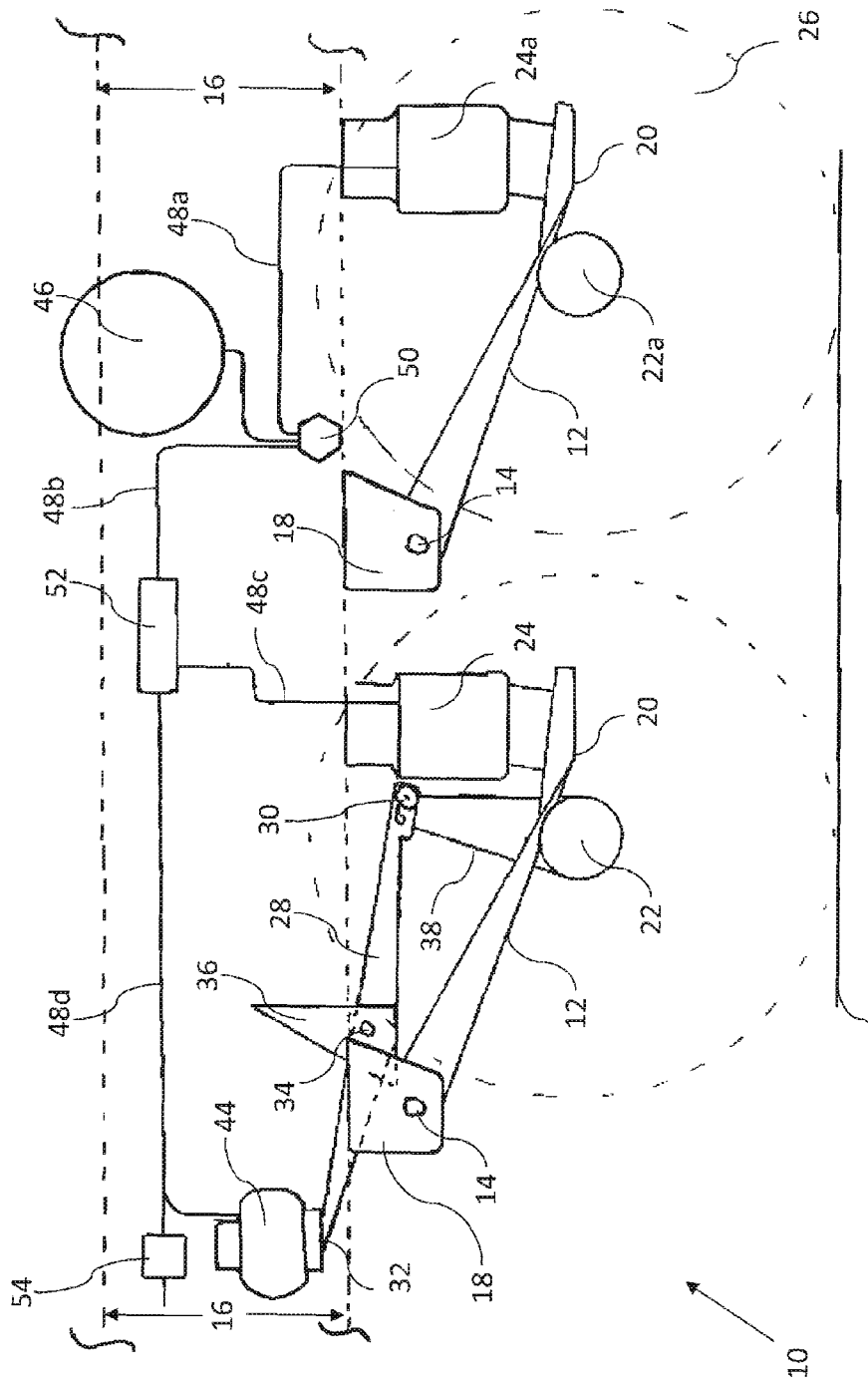
FIG. 1 is a side elevation view of a prior art lift axle with the axle in a lowered position.

A prior art lift axle suspension, generally identified by reference numeral 10, will first be described with reference to FIG. 1 through 3.

Figure 2:
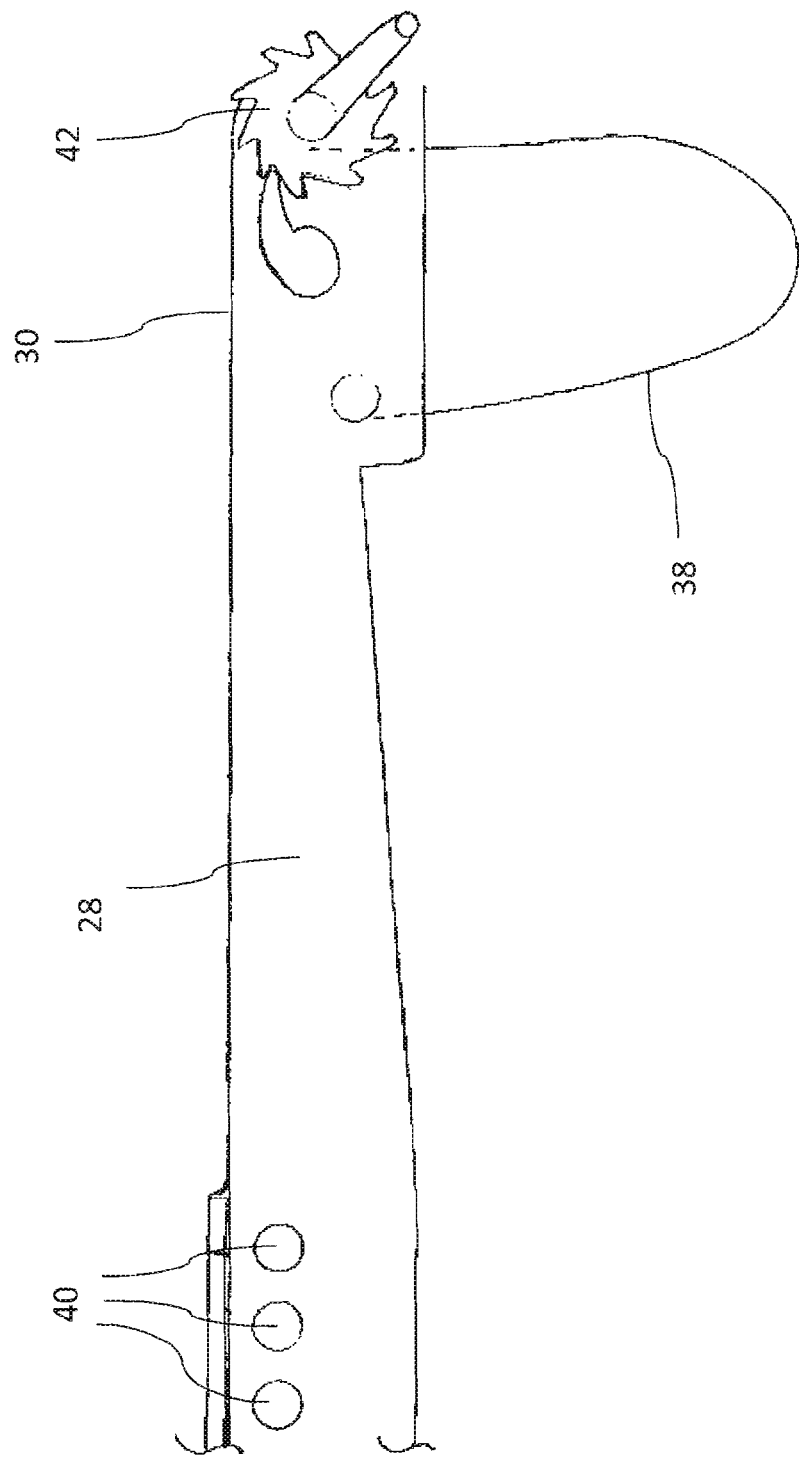
FIG. 2 is a detailed, partial side elevation view of the fulcrum and first end of a lever as illustrated in FIG. 1.

Referring to FIG. 1, pivot arm 12 having pivotal end 14 that is pivotally attached to vehicle frame 16 by pivot arm bracket 18. Remote end with adapter 20 is attached to axle with wheels 22 and is actuated by first suspension air bag 24 shown in extended mode. All elements 12 through 24 are shown as basic lift axle suspension 26. Preferred embodiment 10 comprises lever 28 having a first end 30 and second end 32 which rotates about fulcrum 34 which is attached to frame 16 by lever bracket 36. An adjustable sling 38 adapts first end 30 to axle with wheel 22. Referring to FIG. 2, lever 28 is further adapted with a plurality of adjustably positioned fulcrum points 40 and a sling adjusting mechanism 42. Referring to FIG. 1, second end 32 is actuated by lift air bag 44 shown in deflation mode. Air supply 46 provides pressure through connection hoses 48a-48d. Pressurized air is channelled through load leveler valve 50 to air diverter 52 and regulator 54.

Figure 3:
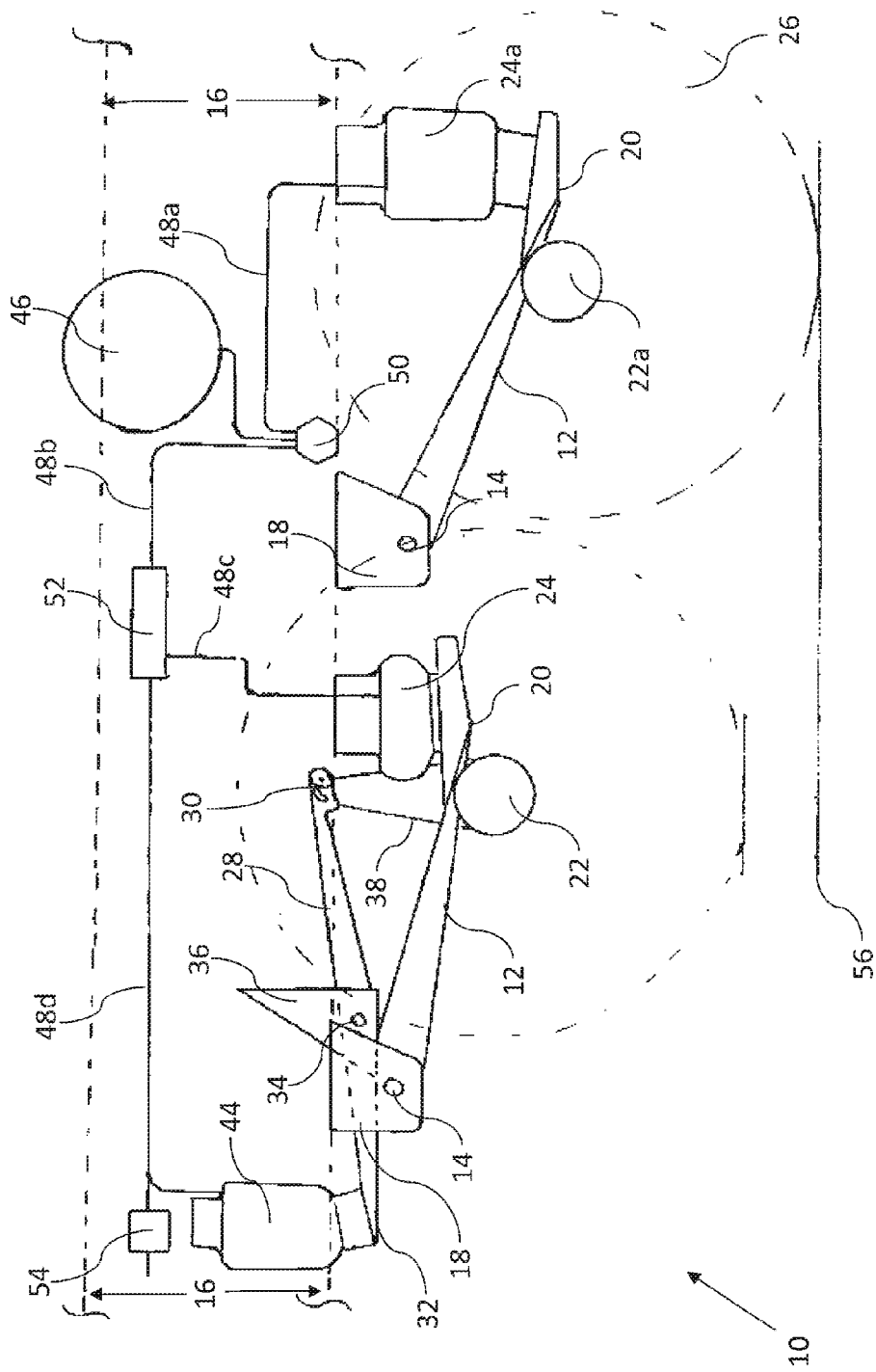
FIG. 3 is a side elevation view of the lift axle assembly illustrated in FIG. 1, with the axle in a raised position.

Referring to FIG. 3, axle with wheels 22 is shown in the elevated position relative to any other axle with wheels at ground level 56. Lift air bag 44 is shown in extension mode and first suspension air bag 24 is shown in deflation mode.

In operation, the weight and contact height of select axles with wheels 22 in multiple, tandem-axle type vehicles may be changed by changing the settings of load leveler valve 50, air diverter 52 and regulator 54. Depending upon the need, air will be diverted to lift air bag 44 which in turn actuates second end 32 of lever 28 causing lever 28 to rotate about the fulcrum 34 and, in turn, lift first end 30. First end 30 then exerts upward pressure on adjustable sling 38, lifting axle with wheel 22 which, in turn, lifts remote end with adapter 20 which is now able to deflate and compress first suspension air bag 24 by exhausting air to atmosphere through diverter valve 52. The result is an elevated wheel position relative to ground level 56 such that the tires on axles with wheels 22 that are part of lift axle suspensions 10 are conserved.

Further, should the need to adapt the lift axle suspension 10 to a different vehicle, an operator may select one of adjustably positioned fulcrum points 40 and adjust the sling by operating sling adjustment mechanism 42.

In order to allow for safe operation of a lift axle, the prior art lift axle suspension 10 described above was designed to ensure that the safe operating load limit could not be exceeded when a trailer is being operated in the "lift" or "up" mode. In the lift axle mode, diverter 52 is set to supply air to lift bag 44, which causes corresponding air bag 24 to be compressed and axle 22 to be raised. Regulator 54 is set to prevent the pressure in line 48d from exceeding a maximum value. With diverter 52 in the "up" position, this also limits the pressure in lines 48a that connects suspension bag 24a to load leveller valve 50 and line 48b that connects load leveller valve 50 to diverter 52 thereby reducing the lift capacity of air bag 24a related to the "always down" axle 22a. This ensures that the load limit, as set by regulation, the manufacturer, or the user to ensure the lift axle is operated within safe operating ranges. As the load on rear axle 22a, or "always down" axle, increases, the air pressure required to maintain the desired ride height will increase. However, regulator 54 will prevent the air pressure from exceeding the maximum value when diverter 52 is set to supply pressure along line 48d. As the load on the trailer is increased beyond the safe operating load limit, the trailer deck will continue to lower as regulator 54 prevents the air pressure from increasing to maintain the ride height. This will either draw the operator's attention to the problem, and at high enough pressures, will prevent the axles from being lifted outside the safe operating range.

Figure 5:
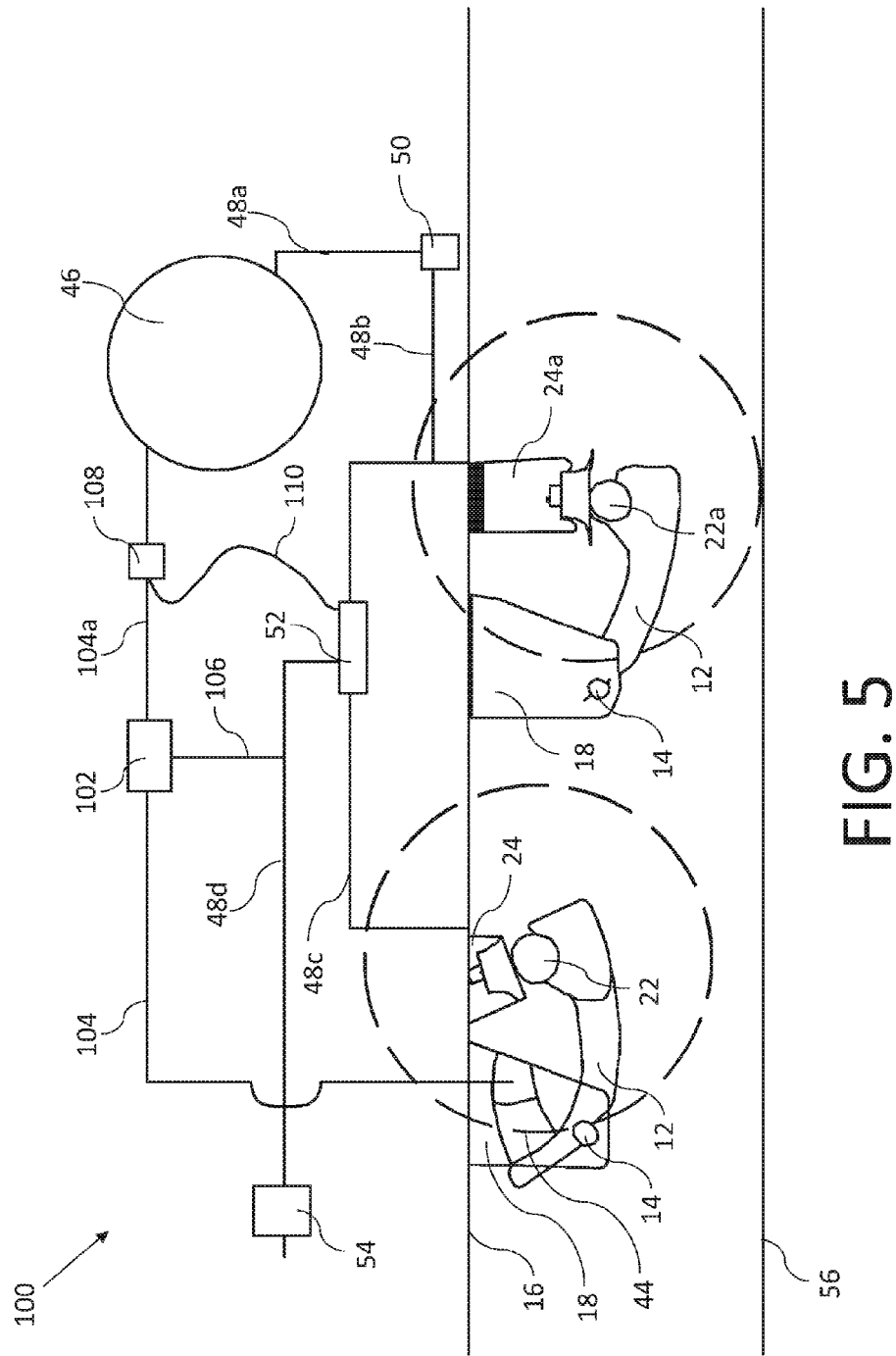
FIG. 5 is a side elevation view of an alternate lift axle assembly with the axle in a raised position.

Referring now to FIG. 5, a modified lift axle suspension 100 is shown. In this embodiment, similar reference numbers have been used for similar components. It will be understood that, even though the reference numbers are the same, the operation of some components may be different. Some of these differences are described below, while other differences will be implicitly understood by those skilled in the art, including changes in the design based on different operating ranges or specifications. As can be seen, lever 28 on modified lift axle 100 does not require the same mechanical advantage to raise axle 22 in the lift mode when compared to lift axle suspension 10 described previously. It was previously found that such a mechanical advantage was required when lift bag 44 was supplied with a lower air pressure. However, in the present system, diverter 52 is able to supply lift bag 44 with air up to the pressure found in air supply 46 such that a mechanical advantage is not required. As such, the presently described system can be installed with different types of lift axles that use a wide range of lever designs to lift and hold lift axle 22 in the "up" position.

Modified lift axle suspension 100 permits lift bag 44 to be operated at higher pressures. This may be desirable, for example, when lift bag 44 is from a different system that has been designed to require a higher pressure, such a pressure up to the pressure of air supply 46. As the pressure allowed by regulator 54 will be inherently less than the maximum pressure of air supply 46. This higher pressure may be required due to a different design or position of lift bag 44 that may not benefit from the mechanical advantage of using a lever as in the embodiment depicted in FIG. 4, or if a greater lifting force is desired, such as to hold lift axle 22 in the raised position more securely in order to prevent any wear that may result from vibrations or other movement.

As shown, lift axle suspension 100 has a pilot valve 102 on line 104 that connects air supply 46 to lift bag 44. Pilot valve 102 moves between an open position to supply lift bag 44 with air from air supply 46 and a closed position that isolates lift bag 44 from air supply 46. As shown, pilot valve 102 is a pneumatic valve that is connected to airline 48d via line 106 and configured such that, when diverter 52 is in the "on" or "lift" position, in which line 48c is vented and air is supplied to line 48d, the air pressure is applied to pilot valve 102 via line 106, causing it to move to the open position. Pilot valve 102 will be set to be actuated at a lower pressure than regulator 54, and also lower than the normal operating pressure of suspension bag 24a associated with the "always down" axle 22a. Preferably, pilot valve 102 is also configured to vent line 104 and deflate lift bag 44 when in the closed position.

Other types of pilot valves 102 may also be used, such as an electronic valve or a mechanical valve that moves with diverter 52. A pneumatic valve is preferred as it provides a fails safe. In the event that hydraulic pressure is lost, pilot valve 102 will close, and lift bag 44 will not be energized.

Other locks or checks may also be used, such as switch 108, which provides an override to shut off the lift system. As depicted, switch 108 may be used to force diverter 52 to supply air to line 48c instead of 48d and is connected to diverter 52 by a line 110, which may be a pneumatic, mechanical, or electrical connection. For example, if diverter 52 is normally biased to the position that pressurizes suspension bag 24 and is pushed to the lift position by a control line of pressurized air, switch 108 may vent the control line, allowing the internal bias to return diverter 52 to the suspension position by supplying air to suspension air bag 24 along line 48c. At the same time, switch 108 may also vent line 104a to disconnect and vent lift bag 44 from air supply 46.

Similarly to lift axle suspension 10, modified lift axle suspension 100 uses regulator 54 to limit the maximum pressure applied to suspension bag 24a for the always-down axle 22a. However, by connecting lift bag 44 to air source 46 separately from regulator 54, the pressure applied to lift bag 44 is not limited to the maximum pressure allowed by regulator 54.

Figure 4:
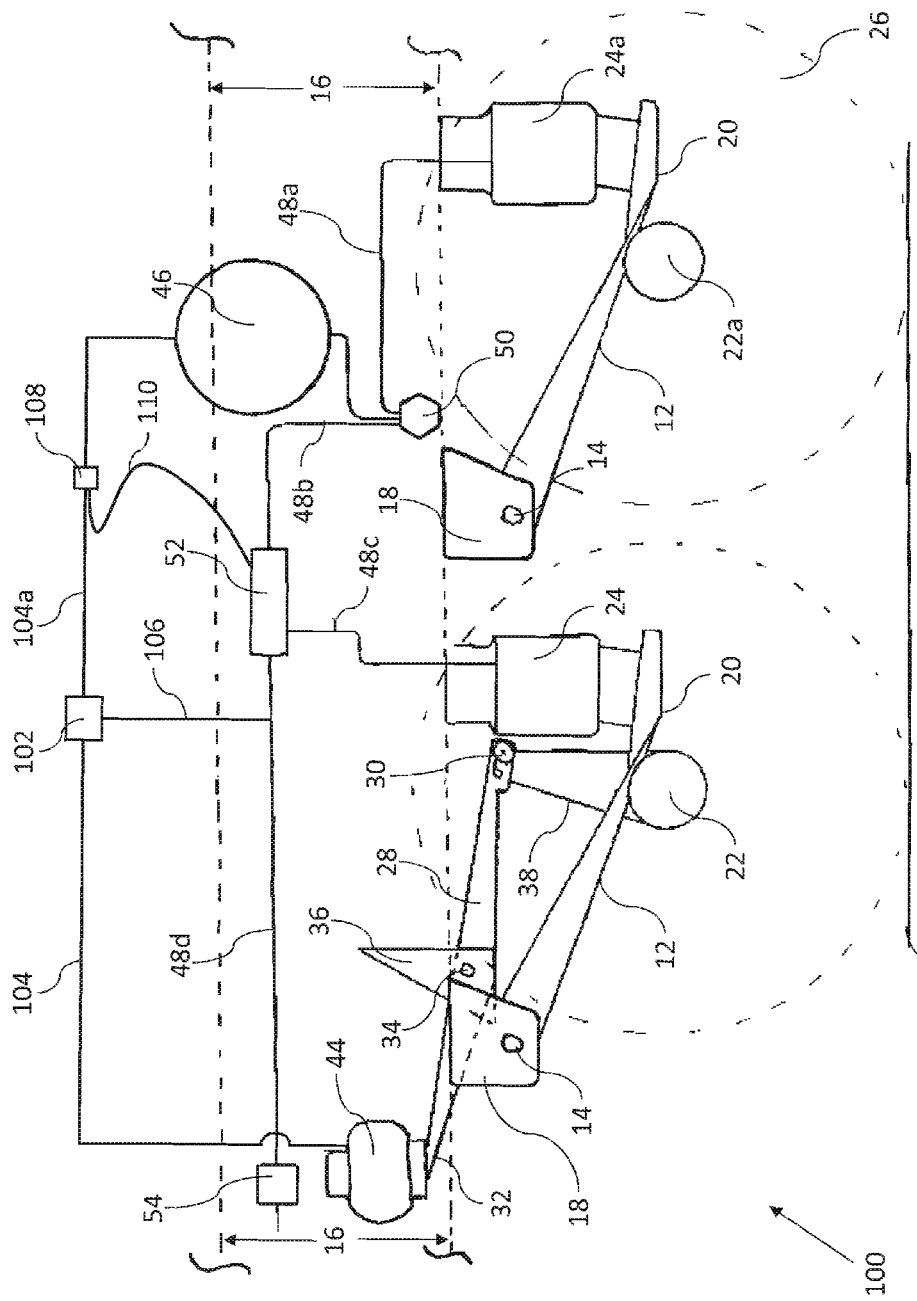
FIG. 4 is a side elevation view of a lift axle assembly.
Figure 6:
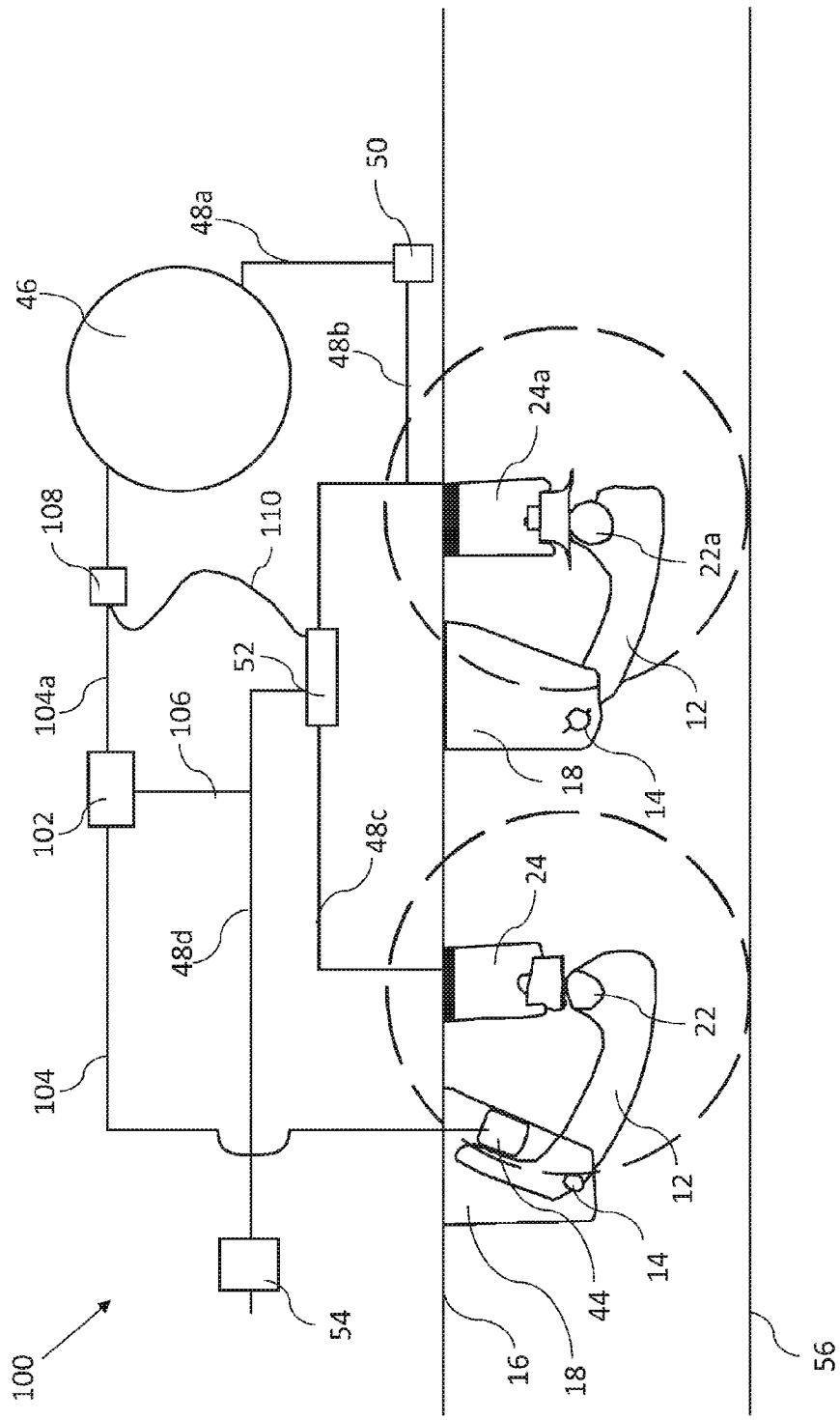
FIG. 6 is a side elevation view of the lift axle assembly illustrated in FIG. 5, with the axle in a lowered position.

Referring to FIG. 5 and FIG. 6, the increased pressure applied to lift bag 44 may also allow for the removal of the second pivot lever 28 used in the embodiment of FIG. 4. As shown in FIG. 5, when axle 22 is in a raised position, lift bag 44 is expanded. As the maximum pressure is greater than the maximum pressure allowed by regulator 54, lift bag 44 applies sufficient force to pivot arm 12 about pivotal end 14 to raise the front axle 22. Referring to FIG. 6, when lift bag 44 is compressed, axle 22 can be lowered to ground surface 56.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A lift axle suspension for a tandem trailer, the tandem trailer comprising at least a first axle and a second axle, the lift axle suspension comprising:

a first suspension air bag mounted to act as suspension for the first axle;

a second suspension air bag mounted to act as suspension for the second axle;

a lift air bag that, when pressurized, applies a lifting force to lift the second axle relative to the first axle;

a first pneumatic circuit that connects the supply of compressed air to each of the first suspension air bag and a diverter valve, the flow of compressed air through the first pneumatic circuit being controlled by a height selector valve that is opened and closed based on the ride height of the trailer, the diverter valve having a first position that supplies compressed air to the second suspension air bag and a second position that supplies compressed air to a pressure regulator that limits air pressure to a predetermined pressure; and a second pneumatic circuit that connects a supply of compressed air to the lift air bag, the flow of compressed air through the first pneumatic circuit being controlled by a pilot valve that is opened when the diverter valve is in the second position.

2. The lift axle suspension of claim 1, wherein the pilot valve is pneumatically actuated, and the pilot valve is opened when air pressure is applied to the regulator.

3. The lift axle suspension of claim 1, wherein the supply of compressed air comprises a pneumatic air cylinder connected to the first and second pneumatic cylinders.

4. The lift axle suspension of claim 1, wherein the second pneumatic circuit comprises an override switch that closes the second pneumatic circuit.

\* \* \* \* \*